United States Patent
Downing

[15] 3,670,907
[45] June 20, 1972

[54] SILO UNLOADER

[72] Inventor: James H. Downing, Mineral, Va.
[73] Assignee: Harris Company, Inc., Mineral, Va.
[22] Filed: April 30, 1970
[21] Appl. No.: 33,298

[52] U.S. Cl. .................................................. 214/17 DB
[51] Int. Cl. ............................................... B65g 65/38
[58] Field of Search .......................... 214/17 DB; 302/56

[56] References Cited

UNITED STATES PATENTS

| | | | |
|---|---|---|---|
| 3,017,044 | 1/1962 | Englemann | 214/17 DB |
| 3,223,256 | 12/1965 | Buschbom | 214/17 DB |
| 2,801,885 | 8/1957 | Harris | 214/17 DB |

*Primary Examiner*—Robert G. Sheridan
*Attorney*—Auzville Jackson, Jr.

[57] ABSTRACT

A leveling device for the wheel-driven frame of a silo unloader which encloses means for transporting ensilage over which it travels, the inner end of which is supported at about the silo center and the outer end of which is rotatable thereabout near the silo wall, comprising means for raising or lowering said outer end depending upon the angle the frame makes with the wall of the silo, said means comprising a wall-engaging wheel, a first arm on which said wheel is mounted to position it at a selected location above the frame, a shaft pivoted in said frame and to which said arm is rigidly connected, a second arm rigidly connected to said shaft, generally parallel to the frame and shorter than the first arm, a bar extending through a slot in and at approximately right angles to the frame to move up and down therein, means pivotally connecting the free end of said second arm to said bar, and means connecting the ends of said bar to the respective unloader driving wheels, so that as the wall wheel moves up or down along said wall it simultaneously effects lowering or raising of the frame outer end with respect to said driving wheels.

16 Claims, 6 Drawing Figures

PATENTED JUN 20 1972 3,670,907

INVENTOR
JAMES H. DOWNING
BY Towson Price
ATTORNEY

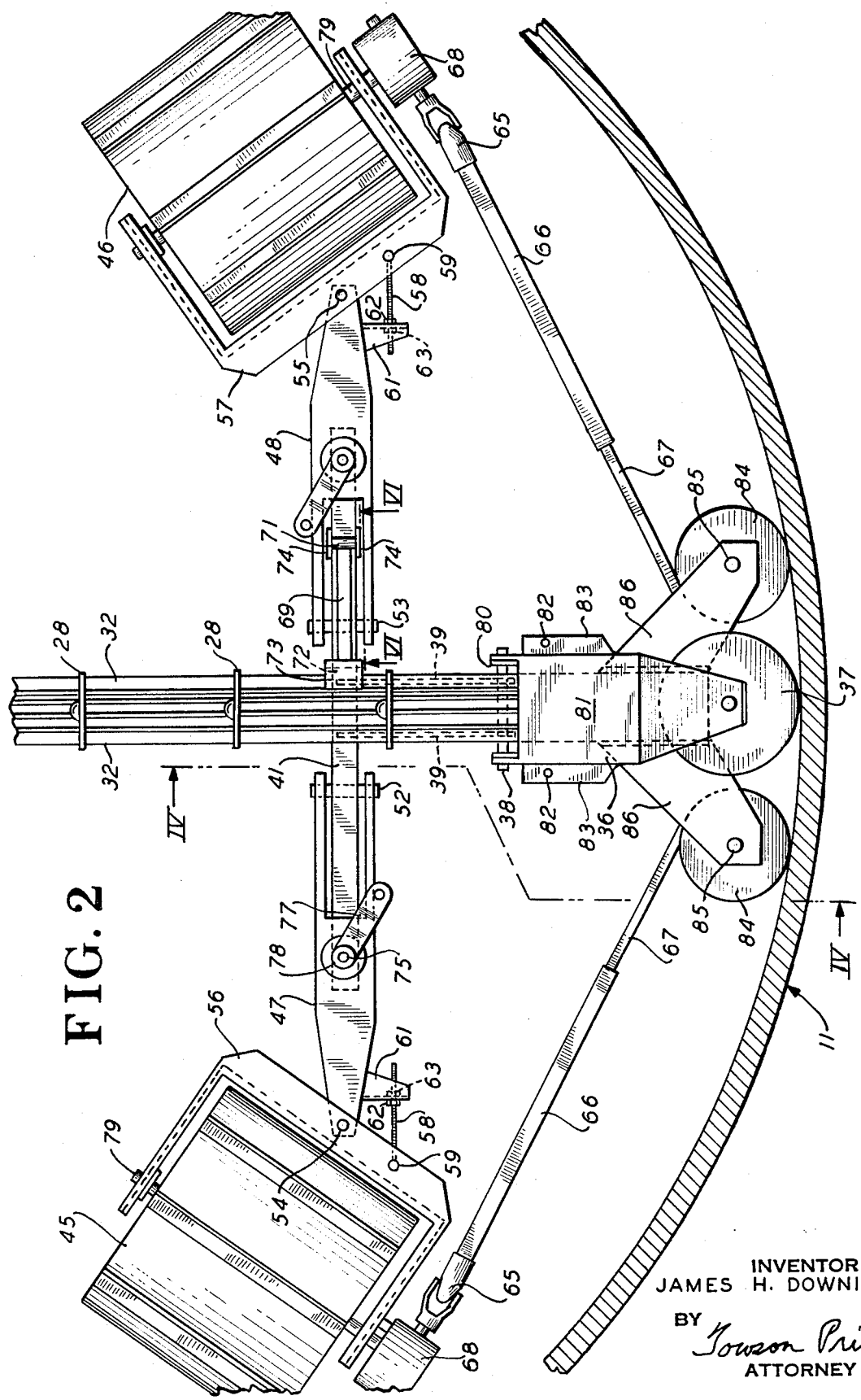

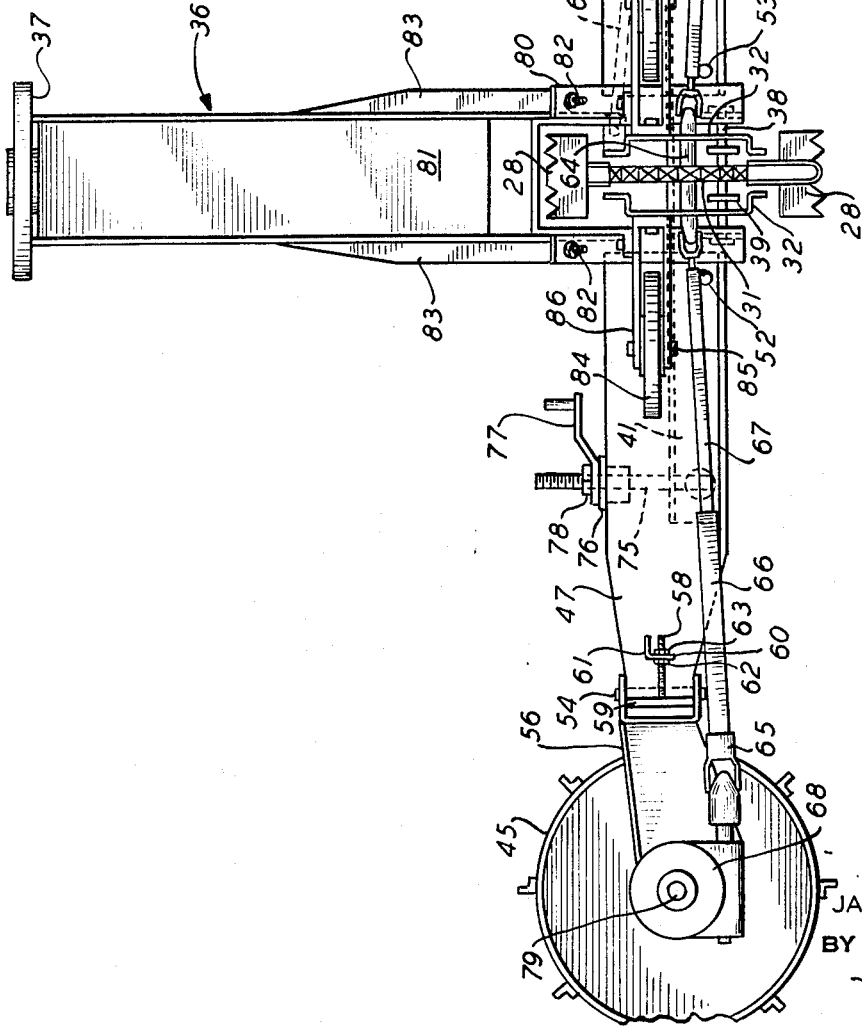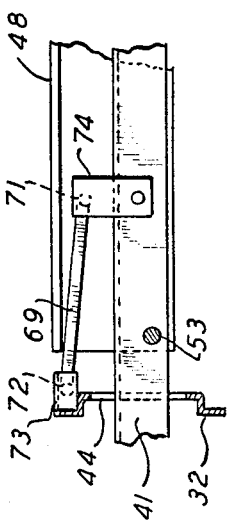

INVENTOR
JAMES H. DOWNING
BY Towson Price
ATTORNEY 3,670,907

1

SILO UNLOADER

SETTING AND OBJECTS OF THE INVENTION

This application discloses a form of silo unloader which is generally like that of the U.S. Pat. No. 3,462,199, dated Aug. 19, 1969, but embodies a leveling device which is mechanical instead of electrical.

This invention relates to material-handling equipment and, more especially, to silo unloaders of the type having collecting means for bringing ensilage to approximately the center of a silo, means for elevating such ensilage, and means for delivering said elevated ensilage from the silo.

Silos, since their inception, have presented the problem of easy and ready removal of ensilage therefrom. This is particularly intensified by the fact that relatively small quantities of ensilage are to be removed frequently. It will be understood that the word "silo" is here used in the broad sense to include enclosures for material other than green fodder.

Present-day silos usually comprise an upright hollow generally-cylindrical structure, closed by a conical or semi-spherical top or roof, and a bottom. The wall of the silo is usually provided with a series of removable doors extending vertically up one side thereof. The ensilage is packed in the silo and serves to maintain the doors in place. As the level of the ensilage descends, the doors are removed one by one.

The hand method of removing ensilage from a silo is to climb up the silo, stand on the ensilage, and pitch the desired quantity of ensilage out of a door opening. Particularly when the ensilage has been frozen, this is time-consuming and sometimes dangerous. Various automatic unloaders have been unsatisfactory since they have required special adaptation of the silo, or are extremely complicated, cumbersome, or expensive to construct, and do not provide convenient means to maintain the ensilage-moving device in a level condition to provide for the desired positive rate of flow of ensilage.

It is therefore, an object of my invention to provide positive means to mechanically maintain the frame of a power-operated unloader for the ensilage in a silo in an approximately level condition at all time during operation.

Another object of my invention is to control the operation of the leveling device by mechanical means actuated by tilting the frame.

A further object of the invention is to provide a positive, simple automatic leveling device which will adjust the elevation of the outer end of a silo unloader frame.

A still further object is to provide a leveling device using fixed mechanical members which can be adjusted either with hand cranks or wrenches, using no weights or electrical components.

These and other objects of the invention reside in specific constructional details, including those of the novel leveling device combined with the preliminary cutting wheel, the gathering of collecting arm apparatus for driving the same, the structure for elevating the ensilage at the center of the silo to the discharge means, means intermediate the collecting arm and elevating structure for stepping up the ensilage transfer speed, and in the structural details of said discharge means.

In the drawings, wherein like reference characters denote like parts in the several views.

BRIEF DESCRIPTION OF THE DRAWINGS

FIG. 2 is a fragmentary plan on a larger scale showing the outer part of the unloader of FIG. 1.

FIG. 3 is an end elevational view of the parts of the unloader illustrated in FIG. 2.

FIG. 6 is a fragmentary vertical sectional view on the line VI—VI of FIG. 2, in the direction of the arrows.

DETAILED DESCRIPTION

Figure 1:
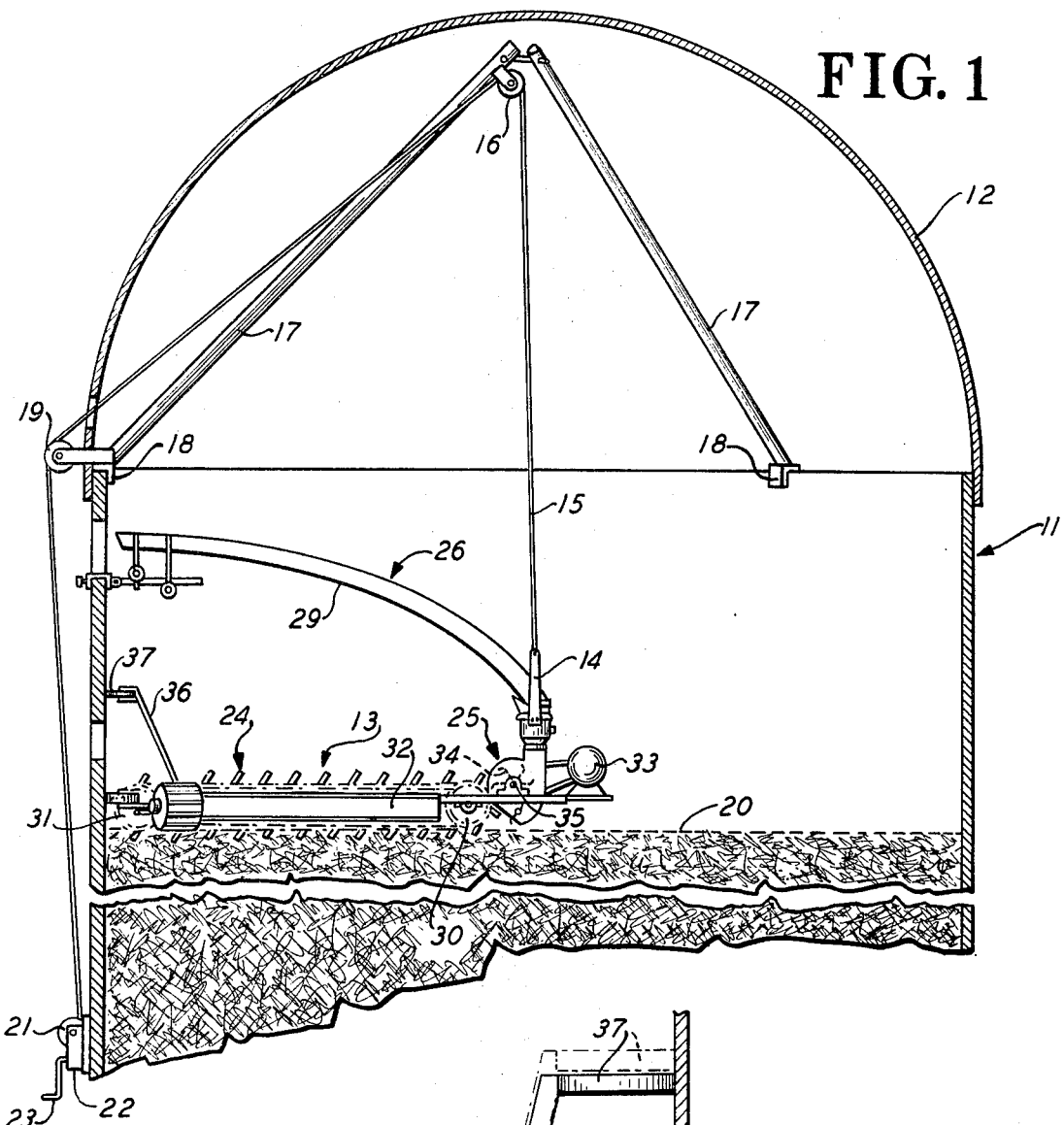
FIG. 1 is a vertical sectional view of a silo with my unloader shown therein in side elevation.

Referring to the drawings in detail, let us first consider the embodiment of the invention illustrated in FIGS. 1 to 4, inclusive, and 6. In FIG. 1 this embodiment is shown set in a silo 11, capped by a hollow semi-spherical dome or roof 12. The silo 11 is hollow and here formed generally cylindrical about a vertical axis. The present embodiment of my silo unloader, generally designated 13, has its inner portion provided with a swivel supporting device or hanger 14, to the upper end of which is attached a cable or rope 15.

The cable 15 here passes up to near the silo dome 12, around a pulley 16, here shown supported by a tripod 17. The lower ends of the tripod legs are provided with angular feet 18 which fit over the top edge of the hollow cylindrical portion of the silo 11. The cable 15 then continues down and toward the outer surface of the silo 11, being guided over a pulley 19 to the drum 21 of a suitable actuating device or hoist. The hoist may be a power-operated winch, such as illustrated at 31' in FIG. 18, of the U.S. Pat No. 3,462,199, referred to, or one 22 manually operated by an operating handle 23, as shown in FIG. 1. Rotation of the handle 23 about its connection with the hoist 22 will thus wind or unwind the cable and effect a corresponding raising or lowering of the supporting device 14 and the connected inner portion of the unloader 13 with respect to the engaged ensilage.

The unloader here illustrated generally corresponds with that of the patent which may be used to show details here omitted. It consists of three main parts, each of which is composed of a number of elements. These main parts are broadly, first, second, and third ensilage transporting means. The first or gathering means, generally designated 24, is for scraping or digging ensilage from the top of that in the silo 11 and moving it generally radially, but circumferentially to some extent, toward the silo axis or center. The second means, generally designated 25, is for receiving and transferring or elevating ensilage delivered near the silo axis by the first means 24. The third means, generally designated 26, is for receiving and conducting ensilage, delivered by the second means 25 through a conduit, from the top of said second means 25, to finally discharge it laterally from the silo.

Said first means 24 comprises an endless sprocket digger chain 27 carrying paddles or ensilage-collecting elements 28. Each element is desirably constructed, as shown in FIGS. 12 and 13, of the patent. The chain 27 is completed by a suitable number of links secured to opposite ends of other but corresponding pivot pins, also carrying rollers as in the patent. The chain is properly carried on and passes around a drive sprocket wheel 30 and a driven sprocket wheel 31 the teeth of which are spaced to correspond with the roller spacing. The wheels 30 and 31 are respectively fixed on suitable drive and driven shafts carried in suitable bearings mounted on the frame 32 of the unloader 13. Adjustment of the tightness of the chain 27 may be effected by adjustment means such as described in the patent.

Power means for the chain 27, here shown as an electric motor 33, is also carried on the frame 32. It carries a sprocket wheel or pulley for driving a blower or centrifugal fan 34. The ensilage, which is moved toward the center of the silo by the digger chain 27 may then be transported by a small-diameter impeller, such as that designated 225 in FIG. 22 of the patent. If not it is received at that place by the second ensilage transporting means illustrated as the centrifugal fan, blower or impeller 34, turning about a horizontal shaft 35 and enclosed in a housing. This blower 34, turns counterclockwise, as viewed in FIG. 1, and directs a blast of air from its lower and left side portions to its discharge or upper outlet portion. This means that the ensilage is moved in a direction generally tangential to the outline of the blower. It is transported to a position immediately to the left and below the blower housing, to be drawn thereinto by a draft of air. After entering the housing, the ensilage is carried, without having to be turned through a sharp angle, and partly air-blown and partly thrown by the vanes or paddles of the blower to the right and up into the discharge outlet portion, from whence it passes to the receiving conduit or curved deflecting chute 29 of the third ensilage-moving means 26. It is this blower housing that is directly supported by the cable 15 through the medium of the swivel supporting device or hanger 14.

Leveling of the frame 32 is here effected mechanically by a lever 36, rather than electrically by a motor-driven actuator, such as 92 of the patent referred to. The lever 36 carries a wheel 37 which is adapted to roll on the inner surface of the wall of the silo 11 in which used, during operation of the unloader. The lower end of the lever 36 is fixed to a rod or shaft 38 which forms a pivot therefor in the frame 32.

Another lever 39, here shown formed as two laterally-spaced portions, has its outer end fixed rigidly to the shaft 38, extends inwardly through the frame 32 and connects with the generally central part of the bar 41, here shown inverted U-shape in cross-section, by a pivot in 42. The pin 42 extends through a transverse web or flange portion 43, formed by suitable means between the depending flanges of the bar 41, and the adjacent end portion of said lever 39. By virtue of the rigid connection of the rod 38 to the overlapping ends of the lever 36 and 39, there is formed in effect, a rigid angular lever or bell crank 36–39, pivoted to the frame 32 at the angle between its parts, and with its inner end operatively connected to the bar 41. The bar 41 passes through slot 44 in the frame 32, forming a T or cross therewith. The vertical dimension of the slot 44 is greater than that of the bar 41 so as to allow for the desired amount of vertical movement therebetween.

The unloader is provided with driving wheels 45 and 46, normally supporting the frame 32, adjustably mounted on the bar 41 and resting on the surface of ensilage 20 in the silo 11. These wheels are for causing the unloader 13 to travel around the silo while gathering ensilage for discharge therefrom, as disclosed in the patent referred to. The means connecting the bar 41 to the wheels 45 and 46 is here shown as consisting of arms 47 and 48 respectively extending between the bar 41 and the frames 56 and 57 of the desirably cleated wheels 45 and 46.

A generally horizontal pin 52 pivotally connects the bar 41 to the inner end of the arm 47, while a similar pin 53 pivotally connects said bar to the inner end of the arm 48. A generally vertical pin 54 pivotally connects the outer end of the arm 47 to the frame 56, which pivotally carries the driving wheel 45. A generally vertical pin 55 pivotally connects the outer end of the arm 48 to the frame 57, which pivotally carries the driving wheel 46.

Each of the frames 56 and 57 is turned about its pivot pin, 54 or 55, to the desired angular relationship with respect to the arms 47 and 48 so as to tend to move generally tangent to their circle of travel. The frames 56 and 57 are then held in that relationship by suitable means, such as a threaded rod 58 pivoted to each wheel as by a pin 59, and with its free end extending through the depending flange 60 of a bracket 61 outstanding from the respective arm 47 or 48, and held in adjusted position by nuts 62 and 63. The wheels 45 and 46 are driven from the shaft 64 of the driven sprocket wheel 31 through universal joints 65, shafts 66 and 67, axially-slidable but not turnable with respect to each other, and gear boxes 68, all as described in the patent and shown in FIGS. 1, 2 and 3 thereof.

In order to maintain the desired relationship between the bar 41 and the frame 32, I provide an anti-twist bar 69, as seen in FIG. 6, formed with transversely extending pivot portions 71 and 72 at its ends. One end of this bar 69 is pivotally connected to flanges depending from a bracket 73 secured to the frame 32. The other end of this bar 69 is pivotally connected between and to plates 74 upstanding from the bar 41 in a shackle hookup. This keeps the bar 41 from turning sideways, but lets it move straight up or down. This is necessary to keep the wheels 45 and 46 properly positioned and the bar 41 from scraping the sides of the slot 44.

Each of the wheel arms 47 and 48 have two side flanges and a top web. Each has a horizontal pivot hole in each flange and the pins 53 and 54 allow these wheel arms to pivotally connect to the bar 41. At each end of the bar 41 is a rod 75 that has a threaded upper portion.

Each threaded portion extends through a thrust bearing 76 in the web of its wheel arm 47 or 48. A hand crank 77 with a nut 78 welded thereto has its nut turned onto each of these threaded rods until it contacts the thrust bearing 76 in its arm 47 or 48, as shown in FIG. 3. Continued turning of the cranks lifts the connected ends of the bar 41. It lifts because the outer end of each wheel arm 47 and 48 connects to a drive wheel frame 56 or 57 held by its drive wheel axle 79. These cranks are used to press down each wheel against the ensilage or floor and cause the bar 41 to move upward until it hits the top of the slot 44. Continued turning of these cranks causes the entire end of the frame 32 to be raised.

I have provided for the adjustment of the lever 36. This lever 36, which is bifurcated and straddles the frame 32, is made in two parts, The first part, made up of short levers or arms 80, shown as an angle iron at each side of the lever 36, has flanges which are parallel to the frame 32, and welded or otherwise fixed to the shaft 38 so that they have to turn with it as a unit. They extend upward short distances and have holes in their lower or outstanding flanges. Now coming down from the wheel 37 is the main part on lever 81 which is pivoted on the shaft 38 and the bifurcations also straddle the parallel flanges of the short arms 80. It has an adjustment bolt 82 on each bifurcation, the heads of which engage the outstanding flanges 83 of the lever 36 and the shanks of which pass through the outstanding flanges of the arms 80. With these bolts and assorted nuts, one can let back or squeeze up tight on the connected parts which are to be moved as a unit. A triangler crack is formed between each pair of connected parts when the nuts are backed off. When these bolts are tightened they force the wheel 37 harder against the silo wall. This makes the leveler respond quicker and also allows the operator to set the machine to run level or cone shape in the silo.

In order to protect the silo wall and keep the unloader 13 within bounds, I provide a pair of bumper wheels 84 pivotally carried on pins 85 between the sides of brackets 86, in turn secured to the sides of the frame 32. The outer ends of the driven shaft 64 extend beneath and beyond these brackets for driving connection with the wheels 45 and 46.

OPERATION

Figure 5:
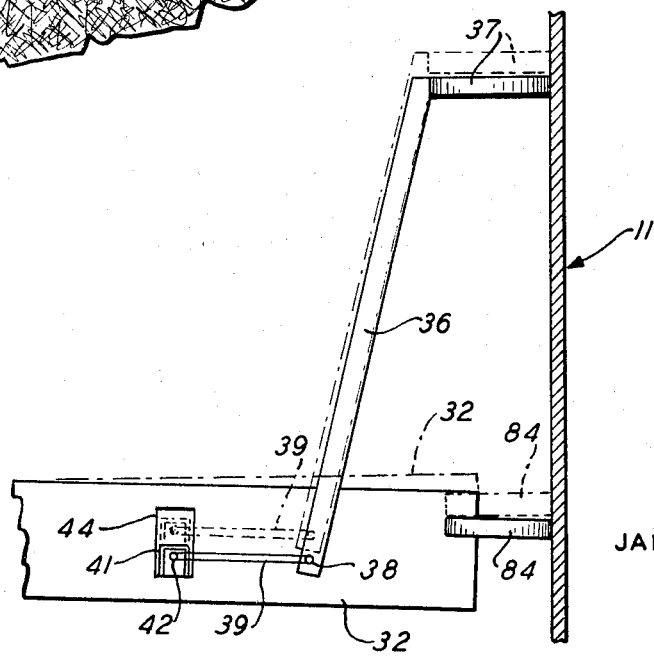
FIG. 5 is a motion diagram based on FIG. 4, to be used for explaining the operation of the parts there shown.
Figure 4:
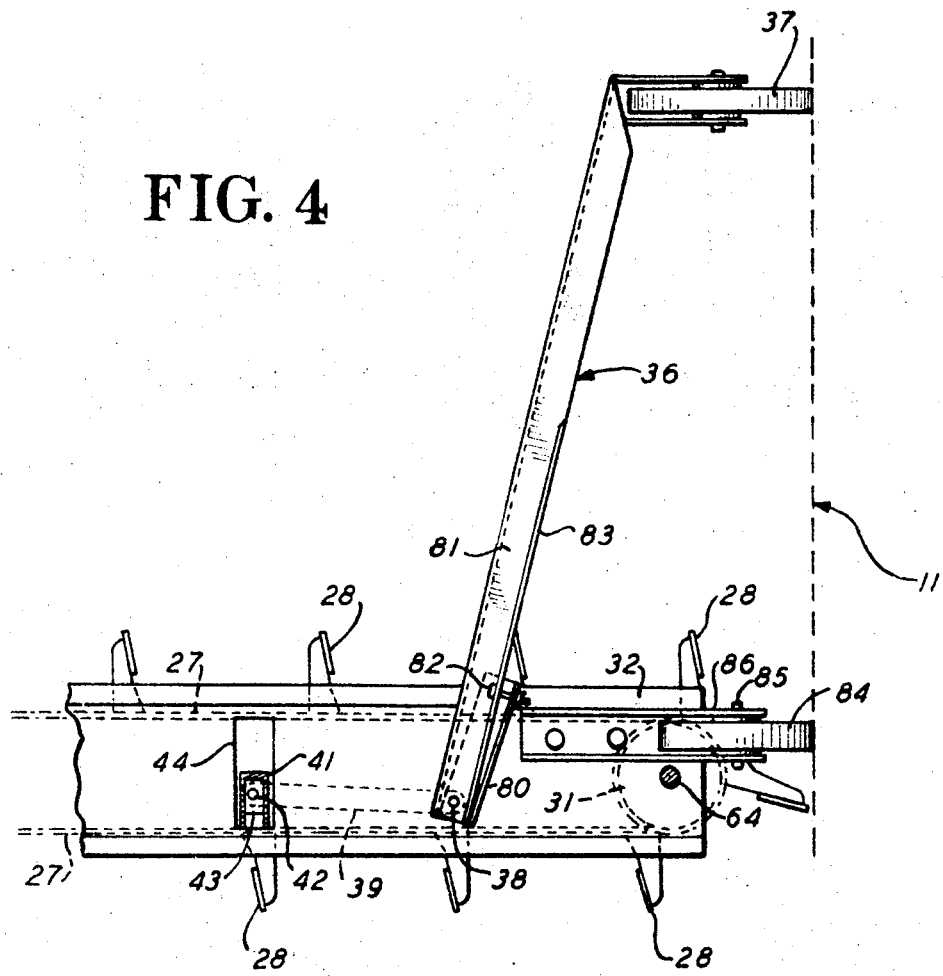
FIG. 4 is a fragmentary vertical sectional view on the line IV—IV of FIG. 2, in the direction of the arrows.

The leveling of the frame 32 is here effected by the wheel 37, which rolls on the silo wall above the frame of the digger chain 32, or other ensilage moving device which might be used, as shown by the motion diagram of FIG. 5. This wheel is mounted on pivoted lever 36, the pivot point being determined by the shaft 38 run through the ensilage moving device frame 32. From this shaft 38 the rigid member 39, fixed securely thereto, is run back to the pin 42 on the wheel bar 41. This wheel bar 41 goes through the digger chain and can work up and down in the slot 44 therein. The drive wheels which rest on the surface of the silo or material are adjustably mounted on each end of this bar 41, as previously explained. Thus the weight of the outer end of the digger chain frame is carried and the distance of the frame 32 is above the material being removed is determined by the drive wheels 45 and 46.

In order for this device to make automatic compensation for the distance the chain peddles 28 are allowed to cut into the material, the following takes place. With the frame 32 level, and the hand cranks turned to apply pressure to the drive wheel axles until the digger chain cuts the correct amount which will not overload the machine, the wall wheel 37 is pulled up tight against the silo wall until the bar 41 is about 1 inch from the top of the slot 44 of the frame 32. With the frame level or nearly so, and the just-described conditions, the drive wheels and the wall wheel have weight or force applied to them.

If in the circle of the silo there is a soft area, which in a lot of cases will be on one side of the silo, the wheels run into this soft area in their path and sink down further. Without the system, this would cause the chain paddles to cut more. This would soon result in a great sink cut out on one side of the silo and a very unlevel situation across the silo. With this device, when the drive wheels get into this soft materhal, they tend to carry down the whole outer end of the frame assembly 32, leveler 36 and all, or change the angle at which the digger chain frame 32 runs to the wall. What happens is that the wall wheel 37 won't let the digger frame 32 go down because the wall of the silo doesn't give as the pressure or weight on this wheel increases.

The wall wheel support arm 36 and the rigid member 39 being securely connected to the pivot shaft 38, do not change their rigid angle, yet when the pivot shaft 38 tries to go down with the frame 32, it puts more pressure on the wall wheel 37. The silo wall doesn't give, so the frame has no choice but to push down harder on the bar 11 connecting the drive wheels. As the bar resists going down, the reaction at the pivot shaft 38 causes the frame 32 to rise slightly.

No great amount of vertical lift is effected by this device, yet it does move enough so that with several passes of the digger frame 32 around in the silo, it does keep the machine from getting out of level to an unworkable degree. This system relies on the fact that when the frame is not level it does not form a nearly 90° angle with the silo wall.

Thus when shaft 38 drops down from the horizontal, bringing the bar 41 to bear the bottom of the slot 44, the distance from the wheel 37 to the center of the silo shortens. This causes the pressure on the wall wheel 37 to increase and push back, which is turned into a downward push by going through pivot 38 in the frame 32.

This device can also lower the digger chain frame 32 when the frame end rises above the horizontal, as at the hard area of the silo. Thus, when point 38 rises from the horizontal, the distance from the wheel 37 to the center of the silo lengthens. This causes the wall wheel pressure to decrease and the arm 36 moves out. This is turned into an upward lift on the bar 41 by going through the pivot 38 in the frame 32. This action in operation allows the bar 41 to ride upward in the slot as indicated by the dotted line position in FIG. 5, and thus lower in the digger chain further into the material being removed from the silo.

I desire to have the wall wheel 37 in contact with the silo wall at all times, on an arm 36 that positions this wheel some distance up on the silo wall above the frame. This arm 36 is here shown rigidly connected to a shaft, which can pivot in the digger chain frame. There is another arm 39, besides the adjusting arms 80, that is also rigidly connected to the above pivoting shaft and that runs generally parallel to the digger chain frame 32. As an alternative, the two arms may be formed integral as one angular arm or bell crank. The second arm or lower part 39 is desirably shorter in length than the arm holding the wall wheel, to get a desired leverage. There is a cross bar 41 pivotally connected to the free end of the second arm. There is a slot 44 in the digger chain frame for this cross bar to run through and move up and down in, the ends of this bar being supported by the drive wheels 45 and 46.

Having now described my invention in detail in accordance with the requirements of the patent statutes, those skilled in this art will have no difficulty in making changes or modifications in the individual parts of their relative assembly in order to meet specific requirements or conditions. Such changes or modifications may be made without departing from the scope and spirit of the invention and the patent is referred to for details some of which are here omitted for brevity.

I claim:

1. A leveling device for the frame of a silo unloader which encloses means for transporting ensilage over which it travels, the inner end of which is supported at about the silo center, wheels carrying and driving the outer end portion of said frame so that it is rotatable near the silo wall about the supported inner end, said device comprising means for raising or lowering said outer end portion, depending upon the angle the frame makes with the wall of the silo, said means comprising a wall-engaging wheel, a lever on the upper end portion of which said wheel is mounted to position it at a selected location above the frame, a shaft pivoting said lever to said frame, a lower portion of said lever extending from said shaft generally parallel to the frame, a bar extending through a slot in and at approximately right angles to the frame to move up and down therein, means pivotally connecting the free end of said lower lever portion to said bar, and means connecting the ends of said bar to the respective unloader driving wheels, so that as the wall wheel moves up or down along said wall it simultaneously effects lowering or raising of the frame outer end portion with respect to said driving wheels.

2. A leveling device as recited in claim 1, wherein an anti-twist bar is disposed between the wheel-driven frame and the bar which passes through a slot within therein, said anti-twist bar being formed with pivot portions at its ends and extending transversely thereof, a bracket secured to a side of said frame, flanges with pivot apertures depending from said bracket, the pivot portion at one end of said anti-twist bar being received in said apertures, plates with pivot apertures upstanding from said bar which extends at right angles to said frame, and the pivot portions at the other end of said anti-twist bar being received in said apertures.

3. A leveling device as recited in claim 1, wherein a pair of brackets is mounted on the sides and near the outer end of the wheel-driven frame, a pair of normally vertical pivot pins extending between sides of said brackets, and a pair of bumper wheels pivotally carried between said bracket sides and turnable on said pins.

4. A leveling device as recited in claim 1, wherein the shaft is rigidly connected to both portions of said lever, and the lower portion is a second lever generally shorter than the upper portion of first mentioned lever.

5. A leveling device as recited in claim 4, wherein there is a short arm completing the upper portion of said lever and formed as an angle iron, a flange thereof parallel to the frame being fixed to the shaft which pivots the lever to the frame, a flange outstanding from said parallel flange, a flange on said lever overlying said outstanding flange, and an adjusting bolt which passes through registering apertures in said lever flange and outstanding flange, carries a head on one end and a nut threaded on the other end, one of said carried parts engaging one of said flanges and the other, the other, for adjusting the angle between the lever and arm.

6. A leveling device as recited in claim 1, wherein the means connecting the ends of said bar to the wheels comprises a frame pivotally carrying each driving wheel, wheel arms respectively extending between said bar and said frames, a horizontal pin pivotally connecting the inner end of each arm to said bar, and a vertical pin pivotally connecting the outer end of each arm to the adjacent frame.

7. A leveling device as recited in claim 6, wherein each end of the bar has a threaded rod upstanding therefrom, each of the wheel arms has two side flanges and a top web, the horizontal pins are pivoted in said flanges, a thrust bearing carried by each web, with the thrust rods passing thereinto, a hand crank with a nut fixed thereto and turned onto each of said threaded rods above said bearings until it contacts the latter, whereby turning of said cranks adjusts the position of the bar with respect to said arms.

8. A leveling device as recited in claim 6, wherein there is a threaded rod pivoted to each wheel frame, a bracket depending from each wheel arm and provided with a depending transverse flange apertured to receive one of said rods, and a nut threaded on each rod on opposite sides of its receiving flange for setting the angular position of the wheel frames with respect to said arms.

9. A silo unloader adapted to be positioned on the surface of ensilage within a silo, comprising a frame to extend radially of said silo, a frame-enclosed endless digger chain, inner and outer sprocket wheels respectively fixed on generally horizontal drive and driven shafts and over which said chain passes, a series of paddles carried by said chain, which during their bottom flight dig into ensilage on which supported and carry it toward the center of the silo, power means connected to said drive shaft for driving the inner of said sprocket wheels, drive wheels fixed to carrying shafts to support the other end of said frame and the chain for rotating about said sprocket wheels, means to cause said drive wheels to turn and move the outer end of the unloader and the digger chain in a circle inside the silo, means for raising or lowering the outer end of the frame, depending upon the angle it makes with the wall of the silo, said means comprising a third wheel in contact with the wall of said silo, a rigid angular lever on the upper end of which said third wheel is pivotally mounted to position it to turnably engage said wall at a selected location above the frame, a shaft pivoted in said frame and on which said lever is carried intermediate its ends, a bar extending through a slot in and at approximately right angles to the frame to move up and down therein, means pivotally connecting the other end of said lever to said bar, and means connecting the ends of said bar to the respective drive wheels, so that as the lever is angled by movement of the outer end portion of the frame it simultaneously effects an opposing lowering or raising of the frame with respect to said drive wheels.

10. A silo unloader as recited in claim 9, wherein the means to cause the drive wheels to turn comprises gearing from the driven shaft to the drive wheel carrying shafts.

11. A silo unloader as recited in claim 9, wherein an anti-twist bar is disposed between the wheel-driven frame and the bar which passes through a slot therein, said anti-twist bar being formed with pivot portions at its ends and extending transversely thereof, a bracket secured to a side of said frame, flanges with pivot apertures depending from said bracket, the pivot portion at one end of said anti-twist bar being received in said apertures, plates with pivot apertures upstanding from said bar which extends at right angles to said frame and the pivot portions at the other end of said anti-twist bar being received in said apertures.

12. A silo unloader as recited in claim 9, wherein a pair of bumper wheels are pivotally carried at the outer end of said wheel-driven frame between said bracket sides and turnable on said pins.

13. A silo unloader as recited in claim 9, wherein there is a short arm completing said lever and formed as an angle iron, a flange thereof parallel to the frame being fixed to the shaft which pivots the lever to the frame, a flange outstanding from said parallel flange, a flange on said lever overlying said outstanding flange, and an adjusting bolt which passes through registering apertures in said lever flange and outstanding flange, carries a head on one end and a nut threaded on the other end, one of said carried parts engaging one of said flanges and the other, the other, for adjusting the angle between the lever and arm.

14. A silo unloader as recited in claim 9, wherein the means connecting the ends of said bar to the wheels comprises a frame pivotally carrying each driving wheel, wheel arms respectively extending between said bar and said frames, a horizontal pin pivotally connecting the inner end of each arm to said bar, and a vertical pin pivotally connecting the outer end of each arm to the adjacent frame.

15. A silo unloader as recited in claim 14, wherein each end of the bar has a threaded rod upstanding therefrom, each of the wheel arms has two side flanges and a top web, the horizontal pins are pivoted in said flanges, a thrust bearing carried by each web with the threaded rod passing thereinto, a hand crank with a nut fixed thereto and turned onto each of said threaded rods above said bearings until it contacts the latter, whereby turning of said cranks adjusts the position of the bar with respect to said arms.

16. A silo unloader as recited in claim 14, wherein there is a threaded rod pivoted to each wheel frame, a bracket depending from each wheel arm and provided with a depending transverse flange apertured to receive one of said rods, and a nut threaded on each rod on opposite sides of its receiving flange for setting the angular position of the wheel frames with respect to said arms.

* * * * *